May 19, 1936. C. E. RUSSELL 2,041,491
HUMIDIFIER
Filed Oct. 1, 1934 2 Sheets-Sheet 1

INVENTOR,
Charles E. Russell,
BY Howard S. Smith,
HIS ATTORNEY

May 19, 1936.  C. E. RUSSELL  2,041,491
HUMIDIFIER
Filed Oct. 1, 1934   2 Sheets-Sheet 2
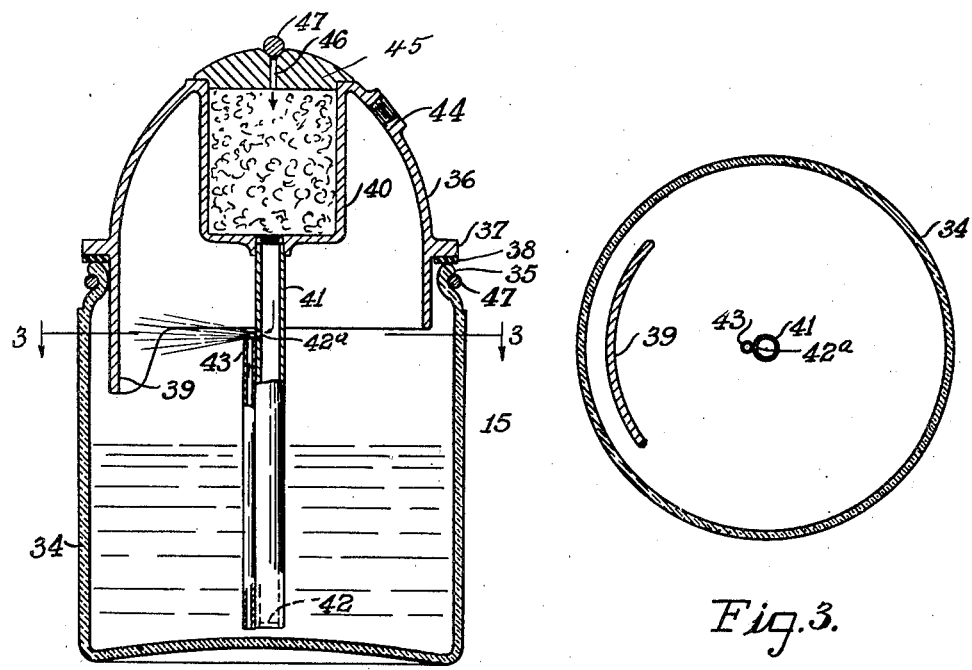
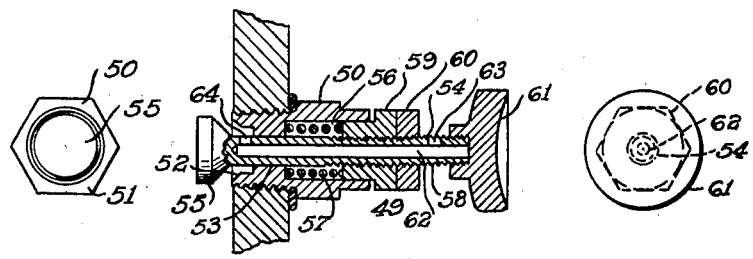
INVENTOR,
Charles E. Russell,
BY
Howard D. Smith.
HIS ATTORNEY Patented May 19, 1936

2,041,491

UNITED STATES PATENT OFFICE 2,041,491

HUMIDIFIER

Charles E. Russell, Dayton, Ohio, assignor to George F. Mox, Dayton, Ohio

Application October 1, 1934, Serial No. 746,312

7 Claims. (Cl. 261—78)

This invention relates to new and useful improvements in humidifiers.

It is one of the principal objects of my invention to provide a fast and efficient process and means for humidifying porous materials or substances through intermittent cycles of drawing a vacuum in an inclosed container and admitting moist air at atmospheric pressure. Time regulation of the cycle through a restricted orifice admitting the moist air, makes possible a rapid evacuation and slow penetration of the humid air.

Another object of the invention is the provision of a method and means for providing heat from the air surrounding a mixer for transference to a surface which the atomized air strikes, and thereby providing heat to be transferred to air which has been refrigerated due to rapid evaporation. This will raise the wet and dry bulb temperature of the outgoing air and cause it to contain more grains of moisture per cubic foot.

It is well known in the cigar trade that a dry cigar is unsaleable, being often tasteless and unsatisfactory. It is also well known that a cigar wrapped in foil or a protective cover is difficult to humidify. Cigars placed in the conventional humidifier require two or three weeks for their proper humidification; and when subject to the moisture of the humidifier for such a long period, frequently mold. With my means for controlling humidity, the driest, wrapped cigars may be satisfactorily humidified in a relatively short time, thereby greatly improving the flavor of the cigar.

Another chief object of my invention is to provide a means for controlling the humidity of refrigerators and other food storage space, by first exhausting the dry, odor-laden air and then reintroducing fresh, moist air to freshen perishable, green foodstuffs and maintain them in their original crisp state for a prolonged period of time.

Other important objects of the invention will be set forth in the following specification and particularly pointed out in the subjoined claims.

Figure 1:
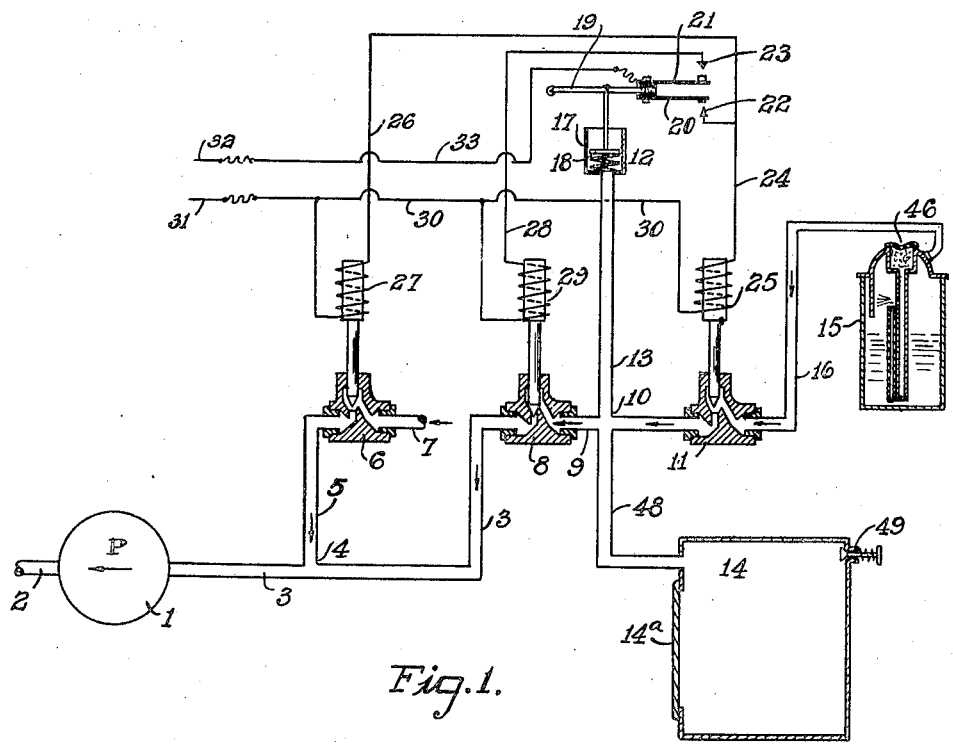

In the accompanying drawings illustrating my invention, Figure 1 is a diagrammatic view of the apparatus employed with my means for controlling humidity. Figure 2 is a sectional view taken through my improved atomizer. Figure 3 is a cross sectional view taken through my improved atomizer on the line 3—3 of Figure 2. Figure 4 is a longitudinal, sectional view taken through my improved vacuum safety control and hand release valve. Figure 5 is a view of the inner end of the valve shown in Figure 4. Figure 6 is an end view of the outer end of the valve shown in Figure 4.

Figure 7:
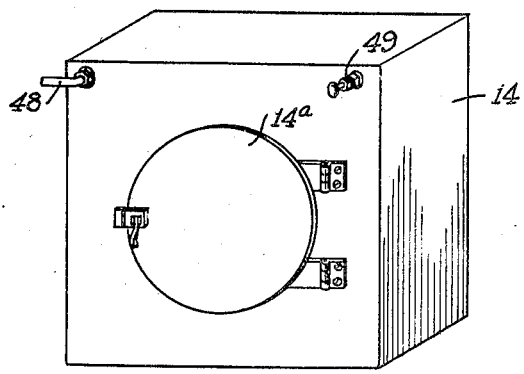

And Figure 7 is a perspective view of a humidifier cabinet.

Referring to the accompanying drawings for a detail description of the forms of embodiment of my invention therein disclosed, the numeral 1 designates a motor driven vacuum pump whose outlet discharges to the atmosphere through a vent pipe 2. (See Figure 1.) To the inlet side of the pump 1 I have connected a suction line 3 including a T 4 and branch connection 5. The latter has attached to the end thereof a conventional solenoid-controlled needle valve 6, through which, when it is opened, air is admitted to the pump 1 from an inlet pipe 7.

The suction line 3 terminates at another solenoid valve 8, which is in all respects like the valve 6 and to whose inlet side a suction line 9 is secured. The line 9 terminates at a "cross" fitting 10 whose opposite opening is connected with the discharge side of a third solenoid valve 11 which is, in all respects, similar to the valve 6.

To one of the lateral ports of the cross fitting 10 I have connected a pressure-controlled, single pole, double-throw switch 12 through a suction line 13. (See Figure 1.) The remaining lateral port of the "cross" fitting 10 is connected with my humidifier cabinet 14 in which the cigars or other objects to be humidified are placed.

The inlet side of the valve 11 is connected with my improved atomizer 15 by a suction line 16, and through which moist air, at substantially room temperature, is drawn.

The vacuum controlled, single pole, double throw switch 12 comprises a pressure cylinder 17 and a spring tensioned piston 18 therein connected with a fulcrumed contact arm 19. Secured to the free end of the arm 19 are spaced contact blades 20 and 21 insulated therefrom. When the vacuum within the cylinder is increased to a predetermined value, the contact blade 20 will contact a lower stationary contact 22; and when the value of the vacuum therein lessens to another predetermined value, the engagement of the contact blade 20 with the contact 22 will be broken and the upper contact blade 21 will contact another stationary contact 23. (See Figure 1.)

The contact 22 is connected by a lead 24 with one terminal of the solenoid winding 25 of the valve 11; and by another lead 26 with one terminal of the solenoid winding 27 of the valve 6. The contact 23 is connected by a lead 28 with one terminal of the solenoid winding 29 of the valve 8. The other terminal of each of the solenoid windings 25, 27 and 29 is connected by a common lead 30 to one of the fused line terminals 31. The other line terminal 32 is connected through a lead 33 with the blades 20 and 21. (See Figure 1.)

My atomizer 15 as shown in Figures 1, 2 and 3, forms an essential element in the successful operation of my humidity control means, and consists of a fluid container 34, preferably cylindrical in form and having a beaded neck 35 of substantially the full diameter of the body of the container. Received within its neck 35 is a raised, dome-shaped cover 36, preferably of cast metal, having a high heat conductivity such as aluminum. Surrounding the base of the cover 36 is a wide annular flange 37 to receive between it and the container neck a yieldable gasket 38.

Below the flange 37, the cover 36 is formed with a deep baffle plate 39 on one side thereof, that extends into the container 34. The function of this baffle will be later disclosed.

In the top of the dome cover 36 I have provided a cylindrical container 40 from whose lower end there depends an air inlet tube 41 whose extreme lower end is closed by a plug 42.

Below the container 40, and opposite the baffle plate 39, the tube 41 has therein an orifice 42a coinciding with the upper open end of a suction tube 43. This suction tube is positioned vertically within the container and is soldered or otherwise secured to the outer wall of the tube 41, its lower open end being adjacent to the lower closed end of the latter.

At one side of the container 40 there is formed on the dome cover 36 a threaded boss 44 to receive therein the suction line 16. The container 40 is adapted to be closed by a flanged cover 45 in the central portion of which a small orifice 46 is provided. When in use, the container is filled with loose cotton. The cover 45 is then replaced, being held in position by a spring clip 47 secured to the neck 35 of the container 34.

When the atomizer is in operation in connection with my humidity control means, air is withdrawn through the boss 44 and line 16. Air is admitted to the container 40 through the orifice 46, and passes through the loose cotton therein to filter dust particles therefrom and temper the air to substantially the temperature of the atomizer.

The air, thus admitted, passes down through the tube 41 and the orifice 42a. As the stream of air passes over the end of suction tube 43, the water, with which the container is partially filled, will be drawn up and blown in a fine spray toward the baffle plate 39.

It is the expressed function of this plate to provide a surface with which the mist contacts at a refrigerated temperature due to rapid evaporation in the atomizer. The thermal conductivity of the metal functions to maintain the baffle at a higher temperature than that of the humid air which contacts it, thus raising the temperature of this air. The air as it now leaves the humidifier will be saturated, but at a lower temperature than the surrounding air and the cabinet 14. Consequently, moisture will not be excessive within the latter.

The baffle raises the wet and dry bulb temperature of the outgoing air to permit it to contain more grains of moisture per cubic foot.

My humidifier cabinet 14 comprises any suitable air-tight cabinet, having hinged to one side thereof a suitable door 14a through which boxed cigars, or other objects to be humidified, are inserted. Connected with the interior of the cabinet 14 is a suction line 48 that terminates at the "cross" fitting 10. Also connected with the interior of the cabinet 14 is a vacuum safety control and hand release valve 49. It is the function of this valve to automatically limit the vacuum within the cabinet to a predetermined value and afford a means to release or "break" the vacuum within the cabinet when it is desired to open the door 14a.

The valve 49 comprises an elongated body 50 having a central hexagonal shoulder 51. At one end the body is externally threaded to be received in an air-tight connection with the cabinet 14. Formed in the face of this threaded end is a conical seat hole 52 that communicates with a smaller central orifice 53. Slidably positioned within this orifice is a valve stem 54 having at one end thereof a conical valve head 55 that engages the seat 52. Within the opposite end of the body is a large counterbore 56 within which a conical spring 57 is placed.

Adjustably positioned upon the outer threaded end 58 of the stem 54 is a shouldered nut 59 whose inner end enters the counterbore 56 for engagement with the spring 57. Positioned against the outer end of the nut 59 is a check nut 60 to maintain the former in its adjusted position. It is the function of the spring 57 to maintain the valve in a closed position until the differential pressure between the vacuum produced within the cabinet and atmospheric pressure is sufficient to overcome the spring pressure. Secured to the outer end of the stem 54 is a concave finger piece 61 which may be depressed to open the valve manually.

When the valve is opened, air is admitted to the interior of the cabinet through an axial passage 62 formed in the valve stem 54. At its outer end, beyond the nut 60, there is provided in the wall of the stem a port 63 communicating with the axial passage 62. Another port 64 is also provided in the wall of the valve stem 54 adjacent to the valve head 55. In Figure 4 I have shown the valve opened to illustrate the position of the valve stem ports 63 and 64.

The operation of my humidifier will now be fully described:

The motor driven vacuum pump 1 is in continuous operation while the device is in use. It is assumed that the cabinet has therein cigars in a dry, stale state, ready to be treated and humidified.

When the door 14a is closed, the pressure within the cabinet will be atmospheric and the vacuum controlled switch 12 will be in a position with the contact blade 21 touching the contact 23. The solenoid winding 29 will now be energized through the leads 28, 30 and 33 from the line terminals 31 and 32, and the valve 8 will be opened. As the operation of the vacuum pump 1 continues, a vacuum will be produced in the cabinet 14 until the atmospheric pressure on the piston 18 caused by the vacuum in the lines 48, 13 and 9, 3 is sufficient to break the contact between the arm 21 and contact 23.

The contact arm 20 will now engage the contact 22, and the valve 8 will be closed. When these contacts are thus engaged, the solenoid windings 25 and 27 will be energized through the leads 24, 26 and 30, 33 from the line terminals 31 and 32. The valves 6 and 11 will now be held open.

Since the valve 8 is now closed, air cannot be admitted to the vacuum pump 1 from the cabinet 14, but the now open valve 6 serves to by-pass air to said pump so that the latter may operate continuously.

Since the valve 8 is closed and the valve 11 is open, and a partial vacuum exists within the cabinet 14, air at atmospheric pressure will be drawn through the atomizer orifice 46 for substantial saturation with moisture before passing through the suction line 16, valve 11 and line 48 to the cabinet.

When a sufficient amount of air has been admitted to the cabinet through the atomizer 15 and the vacuum therein is reduced, the pressure switch 12 will break the engagement of the contact arm 20 with the contact 22 and re-establish the contact of the arm 21 with the contact 23. The cycle of operations will thus be repeated indefinitely until the desired results are obtained, by alternating the operations of drawing the dry, stale air from the cigars and introducing fresh, moisture-laden air to freshen and humidify them in order that they may be rendered saleable.

The foregoing humidifying process and means may be employed for moistening other porous materials and substances, and particularly for restoring them to a fresh, moist state by subjecting them to changing air pressures through intermittent cycles of drawing a vacuum in the cabinet containing them and admitting humid air to them at atmospheric pressure.

Having described my invention, I claim:

1. In a humidifier, the combination with a humidifier cabinet, a vacuum pump for withdrawing air from said cabinet, an atomizer, means for conducting moisture-laden air from the atomizer to the cabinet in response to a vacuum created in the latter, and a pressure switch responsive to the vacuum in the cabinet for opening it to the pump and closing it to the atomizer and for opening it to the atomizer and closing it to the pump.

2. In an apparatus of the type described, the combination with a cabinet adapted to contain cigars, or other articles, a vacuum pump, a branch from the first suction line leading from the cabinet to the pump, an atomizer, a suction line leading from the cabinet to the atomizer, a pressure switch, a branch from the first suction line leading from the cabinet to the pressure switch, a valve in the suction line from the cabinet to the pump for opening and closing said line, a second valve in the suction line between the cabinet and the atomizer for opening and closing said line, and means actuated by the pressure switch in response to the vacuum in the cabinet for opening the first valve and closing the second valve to withdraw air from the cabinet while communication between the latter and the atomizer is closed, and to open the second valve and close the first valve to admit air to the cabinet from the atomizer while communication between the cabinet and the pump is closed.

3. In an apparatus of the type described, the combination with a cabinet to contain cigars, or other articles, a vacuum pump, a suction line leading from the cabinet to the pump, an atomizer, a branch from the first suction line leading from the cabinet to the atomizer, a pressure switch, a branch from the first suction line leading from the cabinet to the pressure switch, a valve in the suction line from the cabinet to the pump for opening and closing said line, a second valve in the suction line between the cabinet and the atomizer for opening and closing said line, a solenoid means for opening and closing each valve, and electric switch means actuated by the pressure switch in response to the vacuum in the cabinet for alternately opening and closing an electric circuit including each solenoid means to alternately open and close said valve for the purpose described.

4. In a humidifier, the combination with a humidifier cabinet, a vacuum pump for withdrawing air from said cabinet, means for continuously operating said pump, an atomizer in communication with said cabinet, means for conducting moisture-laden air from the atomizer to the cabinet in response to a vacuum created in the latter, a pressure valve responsive to the vacuum in the cabinet for opening the latter to the atomizer and closing it to the pump, or opening the cabinet to the pump and closing it to the atomizer, a line leading from the pump to the atmosphere, and means controlled by the pressure valve to open said line from the continuously running pump to the atmosphere when communication between the pump and the cabinet is cut off by said pressure valve.

5. An atomizer comprising a chamber containing a fluid, a thermo-conductive cap on said container, a heat radiating surface in said container, an atomizer jet discharging against said heat radiating surface, an air inlet passage in said cap, to the jet in the container, and a discharge passage for releasing the humid air at substantially the temperature of the surrounding air to offset the refrigeration action of the jet.

6. The process of raising the temperature of humid air discharged by an atomizer, which consists in passing incoming air through thermo-conductive material, then atomizing said air, then discharging the air in its atomized condition against a heat radiating surface, and maintaining said surface at a higher temperature than that of the air discharged against it, but not above room temperature.

7. An atomizer comprising a chamber containing a fluid, a dome-shaped cover for said container, a baffle plate projecting from said cover into the container, an atomizing jet discharging against said baffle plate means for maintaining said baffle plate at a higher temperature than that of the air discharged against it, but not above room temperature, an air inlet passage to the jet in the container, and a discharge passage for releasing the humid air.

CHARLES E. RUSSELL.